United States Patent

[11] 3,581,791

| [72] | Inventor | Friedrich Otto<br>Hameln, Germany |
|------|----------|----------------------------------|
| [21] | Appl. No. | 716,846 |
| [22] | Filed | Mar. 28, 1968 |
| [45] | Patented | June 1, 1971 |
| [73] | Assignee | Belder Trust Reg.<br>Vaduz, Liechtenstein |
| [32] | Priority | Nov. 29, 1967 |
| [33] | | Germany |
| [31] | | St27616 |

[54] APPARATUS FOR COMMINUTING MEAT OR THE LIKE
6 Claims, 5 Drawing Figs.

[52] U.S. Cl. .................................................. 146/192,
146/183, 146/78, 146/124
[51] Int. Cl. .................................................. B02c 18/12
[50] Field of Search .......................................... 146/192,
183, 78, 162, 163, 124, 182

[56] References Cited
UNITED STATES PATENTS
3,219,081  11/1965  Brundler ..................... 146/192X 3,399,704  9/1968  Otto ........................... 146/192X FOREIGN PATENTS
1,009,845  6/1957  Germany ..................... 146/192

*Primary Examiner*—Donald R. Schran
*Assistant Examiner*—F. R. Bilinsky
*Attorney*—Michael S. Striker ABSTRACT: A comminuting apparatus for meat or other mincible materials comprises two concentric annuli of teeth the inner of which rotates with reference to the outer annulus. The material is fed into the area within the inner annulus of teeth and is comminuted during travel between the teeth and radially outwardly beyond the outer annulus. The thus comminuted material enters a ring-shaped chamber of the housing which latter accommodates the teeth, and such material is immediately expelled into the outlet by one or more vanes which rotate with the inner annulus of teeth around the outer annulus. Rapid evacuation of comminuted material prevents discoloration which develops if a batch of comminuted material is allowed to dwell in the housing for extended periods of time.

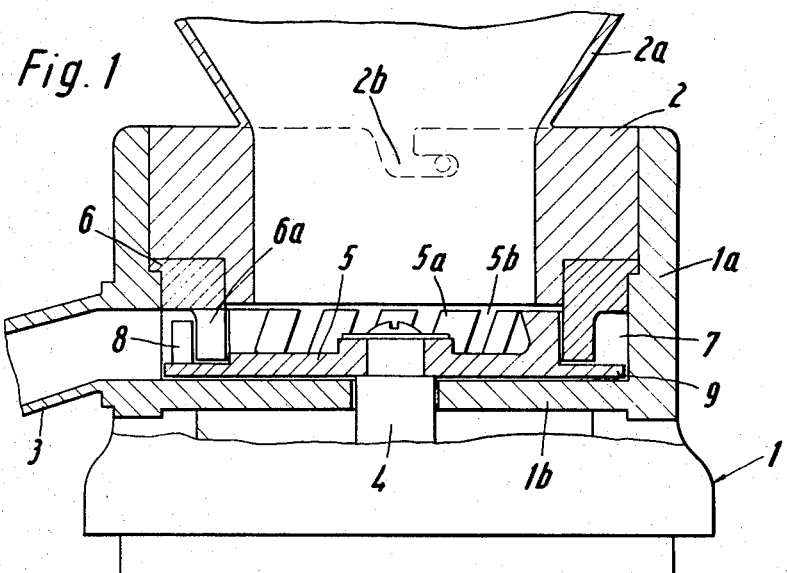
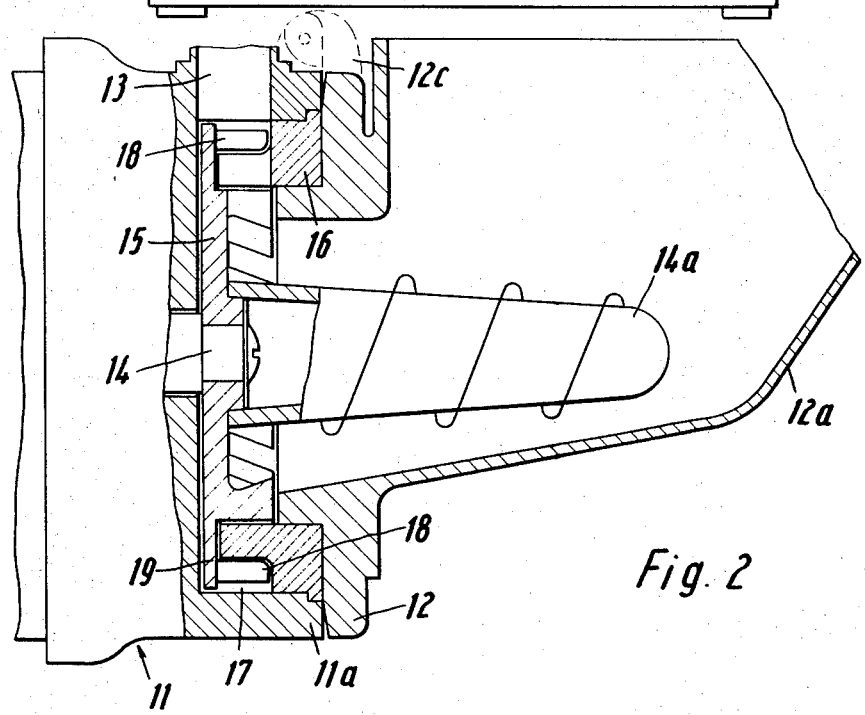

APPARATUS FOR COMMINUTING MEAT OR THE LIKE

BACKGROUND OF THE INVENTION

The present invention relates to apparatus for comminuting meat or like mincible materials. More particularly, the invention relates to improvements in comminuting apparatus of the type wherein a first ring-shaped cutter having an annulus of teeth rotates with reference to a second ring-shaped cutter and wherein the material which is comminuted during passage between the teeth of the cutters moves radially outwardly and/or axially of the cutters and is evacuated through an outlet provided in the housing which accommodates the cutters and has an inlet for admission of mincible material into the range of cutters. As a rule, the comminuted material moves radially outwardly beyond the outer ring-shaped cutter and is evacuated through the outlet in response to pressure exerted thereupon by freshly comminuted material.

It was found that such machines are very satisfactory for comminuting of meat and that they can produce finely comminuted material for use in sausages, hamburgers and/or other meat-containing products. However, it happens from time to time that the comminuted material which issues from the outlet exhibits streaks of discolorations. Experiments have shown that such discolorations do not develop in the proximity of the outlet but rather in the interior of the chamber which receives comminuted material after such material passes through the gaps between the teeth of the cutters. It is believed that the discolorations develop as a result of longer-lasting frictional contact between the surfaces of the housing and comminuted material.

SUMMARY OF THE INVENTION

Accordingly, it is an important object of my invention to provide a novel and improved apparatus for comminuting meat or like mincible materials and to construct and assemble the apparatus in such a way that the comminuted material is free of streaky or otherwise distributed discolorations when it issues from the housing.

Another object of the invention is to provide very simple, compact and inexpensive discoloration preventing means which can be installed in a comminuting apparatus for meat or the like with little cost and by requiring relatively minor changes in the design of such apparatus.

A further object of the invention is to provide a comminuting apparatus which can comminute meat or the like in such a way that the comminuted product is of uniform consistency, not only as regards its particle size but also as regards its color unless the coloration is due to the presence of differently colored particles in the material which is admitted into the apparatus.

The improved apparatus comprises a housing having a material-admitting inlet which can resemble a funnel and may be detachably, hingedly or otherwise affixed to the remainder of the housing, concentric first and second toothed ring-shaped cutters installed in the housing in the path of material which is admitted by way of the inlet, drive means for rotating the first cutter with reference to the second cutter whereby the material undergoes a comminuting action and is advanced substantially radially outwardly beyond the cutters, a chamber provided in the housing around the cutters to receive comminuted material, an outlet provided in the housing in communication with the chamber, and one or more material-transporting members provided in the chamber and arranged to rotate in the chamber to convey comminuted material toward and into the outlet. Such transporting members may resemble vanes and may be rigidly secured to the rotary cutter or directly to the shaft which drives the rotary cutter. The vanes may extend radially and/or axially beyond the cutters, depending on the configuration of the chamber. If the apparatus comprises several sets of cutters which include one or more first sets for bringing about a preliminary or coarse comminuting action and a last set which brings about a final comminuting action, the material-transporting members are provided in a chamber which surrounds the last set of cutters. In order to insure complete evacuation of comminuted material without any delay, the material-transporting members preferably extend into immediate proximity of an internal surface of the housing which surrounds the cutters and delimits a portion of the chamber in the housing.

The novel features which are considered as characteristic of the invention are set forth in particular in the appended claims. The improved comminuting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly central vertical sectional view of an upright comminuting apparatus which embodies one form of my invention;

FIG. 2 is a similar partly elevational and partly central vertical sectional view of a horizontal comminuting apparatus with an inlet which is hingedly connected to the remainder of the housing;

DESCRIPTION OF THE PREFERRED EMBODIMENTS

Figure 3:
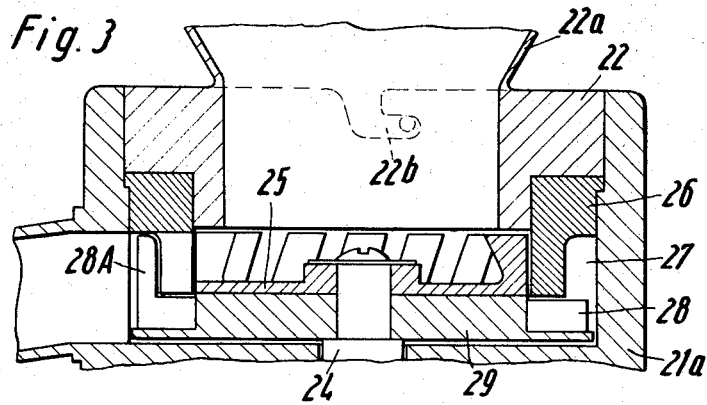
FIG. 3 is a fragmentary partly elevational and partly central vertical sectional view of a third apparatus which comprises several differently configurated transporting members.

Referring first to FIG. 1, there is shown an upright comminuting apparatus comprising a housing 1 which includes a floor-supported or table-supported main body portion 1a the upper part of which forms an upright cylinder and accommodates a collar 2 provided at the lower end of a material-admitting inlet 2a here shown as a funnel. The collar 2 is detachably held in the top part of the main body portion 1a by a bayonet connection 2b. A transverse horizontal partition 1b of the housing 1 supports the upper end of a rotary drive shaft 4 which is detachably connected to a first ring-shaped cutter 5 having an annulus of teeth 5a separated by gaps or slots 5b. A stationary second ring-shaped cutter 6 having teeth 6a separated by gaps (not shown) is removably installed in the housing 1 between the main body portion 1a and collar 2 so that the annulus of teeth 6a surrounds the annulus of teeth 5a. The main body portion 1a defines an annular chamber 7 which surrounds the outer annulus of teeth 6a and this main body portion is further provided with a material evacuating outlet 3 which communicates with the chamber 7. A ring-shaped radial extension 9 of the rotary cutter is rigid with one or more vanelike transporting members 8 which are accommodated in the chamber 7 and are arranged to rotate around the teeth 6a so as to convey comminuted material toward the outlet 3. The height of the vane or vanes 8 approximates or equals the height of teeth 5a, 6a.

When the apparatus is in use, the funnel 2a feeds meat or like mincible material into the area surrounded by the inner annulus of teeth 5a. These teeth force the material through the gaps 5b and cooperate with the teeth 6a to comminute the material and to force the thus comminuted material through the gaps between the teeth 6a and into the chamber 7 where the comminuted material is immediately entrained by the vane or vanes 8 and is transported toward and is forced into the outlet 3. It was found that the provision of one or more rotary vanes 8 eliminates streaks of discoloration in the comminuted product, probably because the product cannot dwell in the chamber 7. The shaft 4 is preferably driven by an electric motor (not shown) by way of a suitable transmission. The inlet 2a may receive material intermittently or continuously, e.g., from a feed conveyor.

FIG. 2 shows a portion of a horizontal comminuting apparatus wherein all parts analogous to those shown in FIG. 1 are denoted by similar reference numerals each of which is preceded by the digit "1." The drive shaft 14 is horizontal and is detachably connected to the rotary cutter 15 and to a feed screw 14a which extends toward and into a substantially L-shaped inlet or funnel 12a. The latter is rigid with a flange 12 which is articulately coupled to the main body portion 11a of the housing 11 by a horizontal hinge 12c. The cutter 15 rotates in a vertical plane and the stationary cutter 16 is surrounded by an annular chamber 17 communicating with an outlet 13 of the housing. The radial extension 19 of the cutter 15 carries several equidistant material-transporting vanes 18 which rotate around the teeth of the cutter 16 and are rigidly affixed to or integral with the extension 19. The extension 19 is preferably an integral part of the rotary cutter 15. When the motor drives the shaft 14, the shaft rotates the cutter 15 and the feed screw 14a whereby the latter delivers material into the space surrounded by the teeth of the cutter 15 and such material is comminuted during passage between the teeth of the cutters 15, 16 and into the chamber 17. The vanes 18 convey comminuted material into the outlet 13 without delay to avoid streaks of discoloration.

FIG. 3 illustrates a portion of an upright comminuting apparatus wherein all parts similar to those described in connection with FIG. 1 are denoted by similar numerals each of which is preceded by the digit "2." The drive shaft 24 rotates the cutter 25 and a disc-shaped part 29 which is adjacent to the underside of the cutter 25 and may be rigid or integral therewith. The chamber 27 surrounds the teeth of the stationary cutter 26 and extends downwardly beyond the cutter 25 so that its lower portion accommodates one or more material-transporting vanes 28 which are rigid with and extend radially outwardly from the member 29. This latter member further supports one or more substantially L-shaped vanes 28A which have portions extending radially into the lower portion of the chamber 27 and upwardly in parallelism with the axis of the rotary cutter 25 so as to travel in a path which is adjacent to the outer sides of teeth on the stationary cutter 26. The collar 22 of the funnel 22a is attached to the main body portion 21a of the housing by a bayonet connection 22b in the same way as in the apparatus of FIG. 1.

Figure 4:
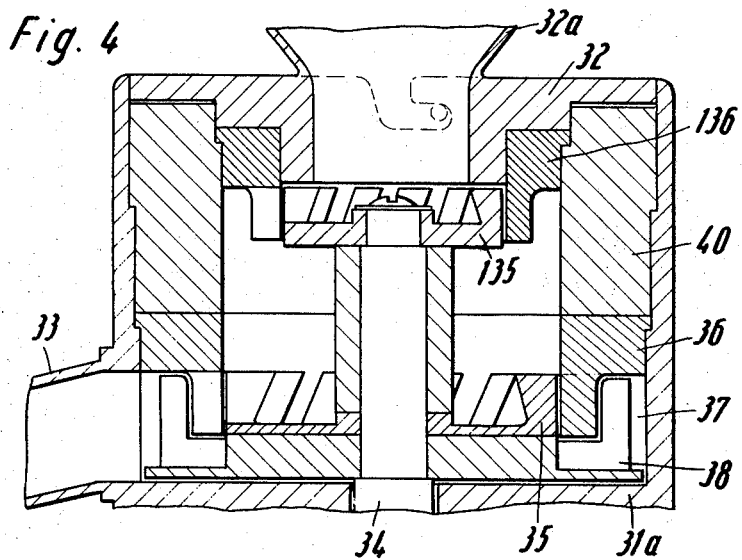
FIG. 4 is a fragmentary central vertical sectional view of a fourth apparatus with two sets of cutters.

FIG. 4 shows a portion of a fourth comminuting apparatus wherein the drive shaft 34 rotates two rotary cutters 35 and 135. Each of these cutters cooperates with one of two stationary cutters 36, 136. A sleeve 40 in the main body portion 31a of the housing holds in position the lower cutter 36 and provides an internal shoulder for the upper stationary cutter 136. The upper cutter 136 is held in position by the flange 32 of funnel 32a. The material to be comminuted is fed through the funnel 32a and undergoes a first or coarse comminuting action during passage between the teeth of the upper cutters 135, 136. Such partially comminuted material then descends into the range of teeth on the lower cutters 35, 36 and undergoes a second or fine comminuting action. The finely comminuted product moves radially outwardly into a chamber 37 defined by the main body portion 31a of the housing around the teeth of the cutter 36. The chamber 37 accommodates two or more L-shaped transporting vanes 38 which sweep around the cutter 36 and transport finely comminuted material into the outlet 33. It will be noted that the vanes 38 do not extend all the way to the internal cylindrical surface of the main body portion 31a.

An apparatus with several sets of cutters which can produce a preliminary or coarse and a fine comminuting action is disclosed in full detail and claimed in my copending application Serial No. 716,722, filed Mar. 28, 1968 for "Apparatus for Finely Comminuting Meat or the Like."

Figure 5:
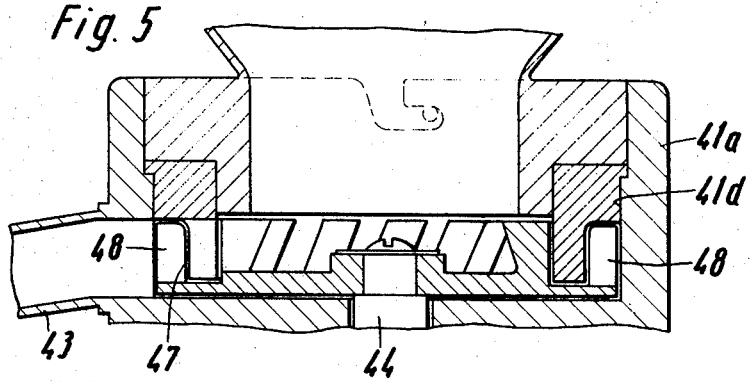
FIG. 5 is a similar view of a fifth apparatus which comprises transporting members similar to those shown in FIG. 1.

Referring finally to FIG. 5, there is shown a fifth comminuting apparatus which is almost identical with the apparatus of FIG. 1 and wherein the parts are denoted by similar numerals each of which is preceded by the digit "4." The main difference is that the material-transporting vanes 48 extend radially outwardly into immediate proximity of the internal surface 41d of the main body portion 41a. Thus, these vanes do not permit any comminuted material to dwell in the chamber 47 because each batch of freshly comminuted material is immediately transported toward and into the outlet 43.

If desired, the feed screw 14a of FIG. 2 can be utilized in each of the apparatus shown in FIGS. 1 and 3—5. Also, this feed screw can be replaced by a suitable weight, particularly if the material is fed intermittently. The weight is then placed on top of a supply of material in the funnel.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desire to be protected by Letters Patent is set forth in the appended claims.

1. Apparatus for comminuting meat or the like mincible materials, comprising a housing having material admitting inlet means, and having an annular inner surface; concentric inner rotatable ring-shaped and stationary outer ring-shaped cutters installed in said housing in the path of material which is admitted by way of said inlet means; drive means for rotating said rotatable inner ring-shaped cutter whereby the material undergoes a comminuting action and is advanced substantially radially outwardly through said stationary outer ring-shaped cutter, said housing defining between said inner annular surface thereof and said stationary outer ring-shaped cutter a substantially annular chamber surrounding said stationary outer ring-shaped cutter and having material-evacuating outlet means in communication with said annular chamber; and rotatable transporting means including at least one annular disc element located in the annular bottom portion of said annular chamber extending over the entire annular bottom portion and adapted to support comminuted material passing through said stationary outer ring-shaped cutter into said annular chamber and at least one rotary-transporting member firmly mounted on said annular disc element and extending into said annular chamber so as to advance towards said outlet means any comminuted material after the same has passed through said stationary ring-shaped cutter into said annular chamber and has been deposited on said annular disc element.

2. Apparatus as defined in claim 1 wherein said transporting member extends radially from in proximity to said outer ring of cutting teeth to in proximity to said annular inner surface of said housing and extends axially over a length coextensive with said outer ring-shaped cutters.

3. Apparatus as defined in claim 1, including a rotary transport member mounted on said rotatable transporting means and projecting into said annular chamber.

4. Apparatus as defined in claim 3, wherein said rotary transport member has an inner edge located in close proximity to said stationary outer ring-shaped cutter so as to simultaneously remove from said stationary outer ring-shaped cutter comminuted material and to advance such comminuted material towards said outlet means.

5. Apparatus as defined in claim 3, wherein said rotary transport member has an outer edge located in close proximity to said inner annular surface of said housing so as to simultaneously remove any comminuted material adhering to said inner annular surface and to advance all comminuted material towards said outlet means.

6. Apparatus as defined in claim 3, wherein said rotary transport member has an inner edge means located in close proximity to said stationary outer ring-shaped cutter and outer edge means located in close proximity to said annular inner surface of said housing so as to simultaneously remove any comminuted material from said stationary outer ring-shaped cutter and said inner annular surface and to advance all comminuted material towards said outlet means.